United States Patent [19]

Yang

[11] Patent Number: 5,011,643
[45] Date of Patent: Apr. 30, 1991

[54] PROCESS FOR MAKING ORIENTED, SHAPED ARTICLES OF PARA-ARAMID/THERMALLY-CONSOLIDATABLE POLYMER BLENDS

[75] Inventor: Hung H. Yang, Richmond, Va.

[73] Assignee: E. I. Du Pont de Nemours and Company, Wilmington, Del.

[21] Appl. No.: 337,507

[22] Filed: Apr. 13, 1989

[51] Int. Cl.$^5$ .............................................. D01D 5/28
[52] U.S. Cl. ................................. 264/171; 264/184; 264/205; 264/210.3; 264/210.6; 264/210.8; 264/211.16; 264/211.19
[58] Field of Search ...................... 264/184, 171, 210.8, 264/211.16, 203, 205, 210.3, 210.6, 211.19; 428/364, 373

[56] References Cited

U.S. PATENT DOCUMENTS

| | | | |
|---|---|---|---|
| 3,767,756 | 11/1973 | Blades | 264/184 |
| 3,869,429 | 4/1975 | Blades | 260/78S |
| 4,228,218 | 11/1980 | Takayanagi | 525/58 |
| 4,340,559 | 7/1982 | Yang | 264/181 |
| 4,357,389 | 11/1982 | Satoh et al. | 264/364 |
| 4,464,323 | 8/1984 | O'Brien | 264/187 |
| 4,631,318 | 12/1986 | Hwang et al. | 525/432 |
| 4,725,394 | 2/1988 | O'Brien | 264/187 |
| 4,810,735 | 3/1989 | Uy | 524/157 |

FOREIGN PATENT DOCUMENTS

| | | |
|---|---|---|
| 57-18342 | 11/1982 | Japan |
| 59-163418 | 9/1984 | Japan |
| 219567 | 4/1988 | United Kingdom |

OTHER DOCUMENTS

U.S. Application Ser. Nos. 304,461 filed 2/01/89, 315,654 filed 2/27/89, 319,492 filed 3/6/89. Thermoplastic Molecular Composite Development, copy of slides from presentation Apr. 29, 1988, at DARPA Polymer Program Review, Arlington, Va.

Primary Examiner—Hubert C. Lorin

[57] ABSTRACT

A process for making oriented, shaped articles of para-aramid/thermally-consolidatable polymer blends by orienting spinnable dopes containing 10 to 25% by weight fiber-forming polymers being at least about 55% and less than about 80% para-aramid and at least about 20% and less than about 45% thermally consolidatable polymer in a common solvent and removing the solvent.

13 Claims, 3 Drawing Sheets

F I G. 1
5 μm

F I G. 2
5 μm

├─────┤
250 μm

├─────┤
250 μm

PROCESS FOR MAKING ORIENTED, SHAPED ARTICLES OF PARA-ARAMID/THERMALLY-CONSOLIDATABLE POLYMER BLENDS

BACKGROUND OF THE INVENTION

The present invention relates to composite materials and more particularly relates to a process for making oriented, shaped articles including fibers and films of para-aramid/thermally-consolidatable polymer blends having composite utility.

High modulus fibers such as poly(p-phenylene terephthalamide) sold under the trademark Kevlar ® by E. I. du Pont de Nemours and Company are useful for incorporation into polymeric matrix materials to produce composites. For some types of composites with thermoplastic polymer matrices, it is desirable to coat the high modulus fiber with the matrix polymer to produce coated fiber known as "prepreg" which can be directly molded into a composite by the application of heat and pressure. However, good quality "prepregs" are difficult to produce since wetting the fiber with the matrix polymer is often difficult. Also, these prepregs are expensive due to the separate process steps necessary to apply the matrix polymer coating.

SUMMARY OF THE INVENTION

In accordance with the invention, a process is provided for making thermally-consolidatable oriented, shaped articles such as fibers and films containing substantially continuous phase of para-aramid polymer in the direction of orientation. The process includes forming under agitation a liquid solution of para-aramid polymer having an inherent viscosity of at least about 3 dl/g and a thermoplastic polymer in a common solvent. The solution has a total fiber-forming polymer concentration sufficient that the solution is bi-phasic and has an anisotropic phase and an isotropic phase. At least about 55% and less than about 80% by weight the fiber-forming polymers are the para-aramid polymer and at least about 20% and less than about 45% by weight of the fiber-forming polymers are the thermoplastic polymer. The anisotropic and isotropic phases are interdispersed with the isotropic phase being present in domains having a size on the average of less than about 300 microns. Preferably, the domain size is less than about 100 microns. The biphasic solution is then subjected to process steps such as extrusion in which the anisotropic phase is oriented and the solvent removed such as by coagulation in an aqueous bath to produce oriented, shaped articles.

In accordance with a preferred form of the process of the invention, the biphasic solution is formed by dissolving the para-aramid in the solvent and then subsequently adding the thermally-consolidatable polymer. In the most preferred form of the invention, the para-aramid is poly(p-phenylene terephthalamide) having an inherent viscosity of at least about 4 dl/g.

In accordance with the invention, a spinnable dope consisting essentially of from about 10% to about 25% by weight of fiber-forming polymers in a common solvent is provided. At least about 55% of and less than about 80% by weight of the fiber-forming polymers are at least one para-aramid polymer having an inherent viscosity of at least about 3 dl/g and at least about 20% and less than about 45% by weight of the fiber-forming polymers are at least one thermally-consolidatable polymer. The para-aramid and thermoplastic polymers are dissolved in the common solvent to form a bi-phasic solution having an anisotropic phase and an isotropic phase. The anisotropic and isotropic phases are interdispersed with the isotropic phase having a domain size of less than about 300 microns, preferably less than 100 microns.

The spinnable dopes and the process of the invention provides fibers, films and other shaped, oriented articles which, as spun, can be formed directly by the application of heat and pressure into novel consolidated parts.

BRIEF DESCRIPTION OF THE FIGURES

FIG. 1 is a transmission electron micrograph at 9,000× of a cross-section of a fiber produced in accordance with a preferred form of the present invention;

FIG. 2 is a transmission electron micrograph at 9000× of a longitudinal section of a fiber produced in accordance with a preferred form of the present invention;

DETAILED DESCRIPTION OF THE INVENTION

Figure 3:
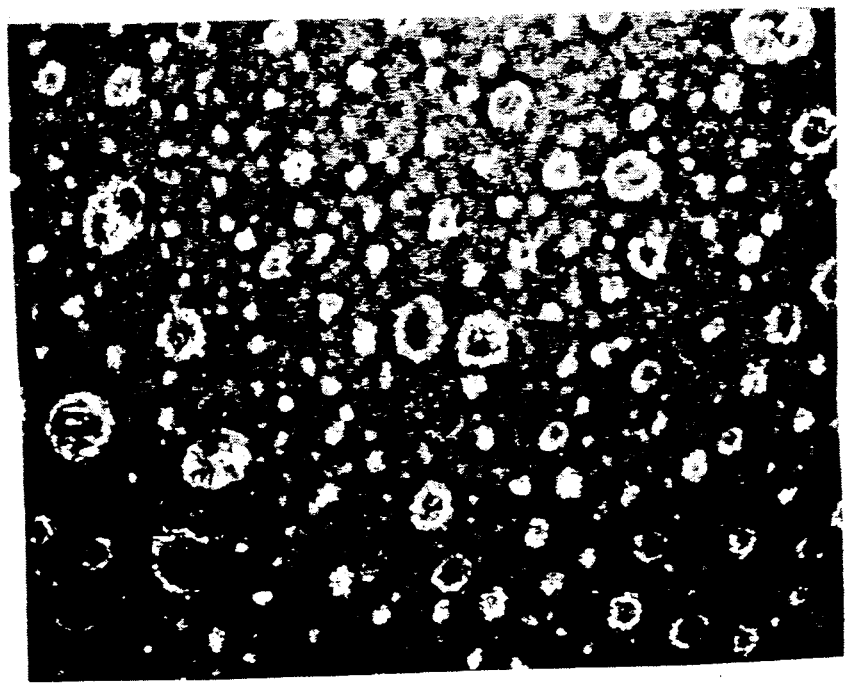
FIG. 3 is an optical micrograph in transmission of a spin dope as employed in example 9.
Figure 4:
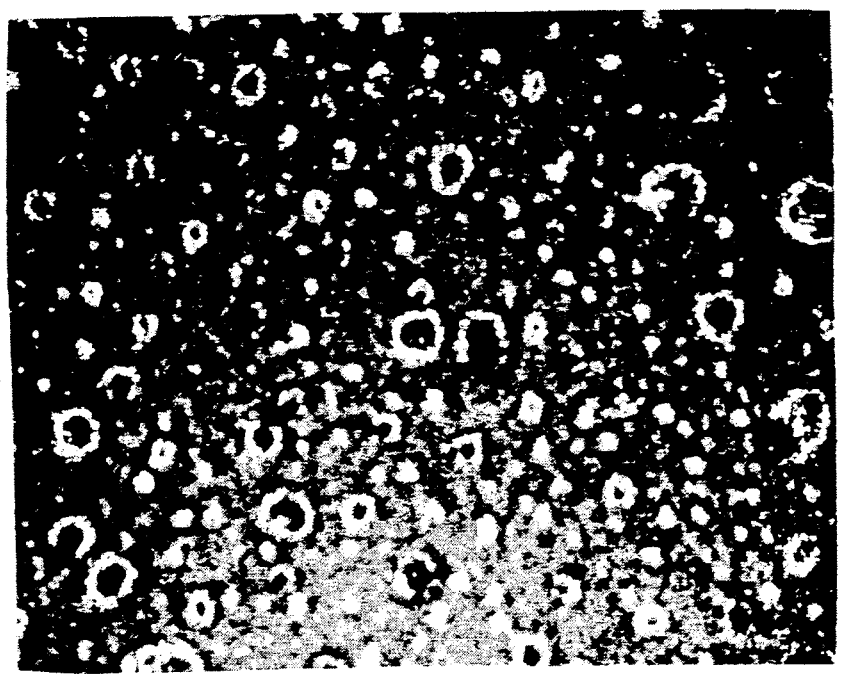
FIG. 4 is an optical micrograph as in FIG. 3 with crossed polarizers.

The process of the invention produces articles of the invention which are comprised of a blend of at least one para-aramid polymer and at least one thermally-consolidatable polymer. The term para-aramid in the present application is intended to refer to para-oriented, wholly aromatic polycarbonamide polymers and copolymers consisting essentially of recurring units of formulas I and II below

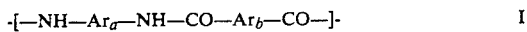

-[—NH—Ar$_a$—NH—CO—Ar$_b$—CO—]-     I

-[—NH—AR$_a$—CO—]-     II wherein Ar$_a$ and Ar$_b$, which may be the same or different, represent divalent, para-oriented aromatic groups. By para-oriented is meant that the chain extending bonds from aromatic groups are either coaxial or are parallel and oppositely directed, e.g., substituted or unsubstituted aromatic groups including 1,4-phenylene, 4,4'-biphenylene, 2,6-naphthylene, 1,5-naphthalene and 4,4'-Ph-X-Ph- or 3,4'-Ph-X-Ph-, where Ph is a phenylene ring, and X is O, CO, S, SO$_2$, NH, NH-CO or (CH$_2$)$_n$ with n=1−4. Substituents on the aromatic groups should be nonreactive and, as will become apparent hereinafter, must not adversely affect the characteristics of the polymer for use in the practice of this invention. Examples of suitable substituents are halogen such as chloro, lower alkyl and alkoxy groups. As will also become apparent, the term para-aramid is also intended to encompass para-aramid copolymers of two or more para-oriented comonomers including minor amounts of comonomers where the acid and amine functions coexist on the same aromatic species, e.g., copolymers produced from reactants such as 4-aminobenzoyl chloride hydrochloride, 6-amino-2-naphthoyl chloride hydrochloride, and the like. In addition, para-aramid is intended to encompass copolymers containing minor amounts of comonomers containing aromatic groups which are not para-oriented, such as, e.g., m-phenylene and 3,4'-biphenylene.

It is preferred for the the para-aramid used in the process of the invention to have an inherent viscosity of greater than 3 dl/g. Inherent viscosities greater than 3 dl/g are desirable to obtain a product having excellent end use characteristics. The most preferred para-aramid polymer for the invention is poly(paraphenylene terephthalamide) having an inherent viscosity of greater than about 4 dl/g.

Para-aramid polymers are capable in an appropriate solvent of forming an anisotropic solution, i.e., microscopic domains of the solution are birefringent and a bulk sample of the solution depolarizes plane polarized light due to the alignment of polymer chains in the domains which causes the light transmission properties of the domains to vary with direction.

The oriented, shaped articles produced by the process of the invention include at least one thermally-consolidatable polymer. The term thermally-consolidatable polymer is intended to refer to any of a wide variety of polymers which can be consolidated with application of heat and pressure by mechanisms including melting, softening and chemical reaction. Preferred for this purpose are thermoplastic polymers, particularly those known for use as a composite matrix. Thermoplastic polymers useful in this invention include polyarylates such as polyetherketoneketone polymers (PEKK), crystalline thermoplastic polyamides (e.g., poly(hexamethylene adipamide) and poly($\epsilon$-caproamide) and amorphous thermoplastic polyamides. Preferred for the practice of the invention are thermoplastic polyamides.

The process of the invention includes forming a bi-phasic solution (dope) of the para-aramid polymer and the thermally-consolidatable polymer in an appropriate solvent. The bi-phasic solution has an anisotropic phase containing the para-aramid polymer and an isotropic phase containing primarily the thermally-consolidatable polymer. For the solution to be bi-phasic, it is necessary for the concentration of the fiber-forming polymers to be sufficiently high that the para-aramid forms an anisotropic phase which is a discrete phase separate from the isotropic phase containing the thermally-consolidatable polymer. However, the resulting solids concentration should be low enough in the solvent used that the para-aramid polymer does not precipitate out of solution, i.e., 10 to 25 percent total solids, preferably, between 15 and about 20 percent.

The solvent selected depends also on the thermally consolidatable polymer. When the thermally-consolidatable polymer is a polyamide, concentrated sulfuric acid, chlorosulfuric acid, fluorosulfuric acid and mixtures of these acids are appropriate solvents with sulfuric acid having a concentration of 98–102% being preferred.

The fiber-forming solids in the dope are made up of at least about 55 percent and less than about 80 percent by weight para-aramid polymer and at about 20 percent and less than about 45 precent by weight of the thermally-consolidatable polymer. In general, it is necessary for the dope to have at least 55 percent and preferably greater than 60 percent by weight of the para-aramid polymer in order to obtain fiber spinning continuity and good tensile strength in the articles. Generally, less than about 20 percent of the thermally-consolidatable polymer makes it difficult to consolidate the articles to produce a composite.

In order to obtain articles in accordance with the invention in which the first polymer phase containing the para-aramid polymer is at least continuation in the direction of orientation as will be described hereinafter, it is necessary for the isotropic domains in the spin dope to be finely-dispersed in the blend, preferably less than about 300 microns, most preferably less than about 100 microns. The bi-phasic solutions thus appear to be homogeneous to the unaided eye. While this can be achieved by adding the polymers simultaneously to the solution and mixing with strong agitation over a long period of time, it is preferable to first dissolve the less soluble lyotropic polymer in the solvent and then subsequently add the more soluble thermally-consolidatable polymer either in solid form or in a solvent. The method of spin dope preparation is thus a staged solutioning process and is based on the observations that (1) rigid chain polymers such as poly(p-phenylene terephthalamide) (PPD-T), have limited solubility in strong acids and they require elevated temperatures for dissolution; and (2) thermally-consolidatable polymers such as thermoplastic polyamides dissolve in strong acids readily to high concentrations even at room temperature. The staged solutioning method avoids the potential for poor mixing and poor heat transfer during dope preparation with simultaneous mixing of the dry polymers which can lead to an inhomogeneous spin dope containing a separate phase of rigid polymer either due to inadequate dissolution or to recrystallization. Prolonged mixing can also cause polymer degradation and trigger the recrystallization of rigid polymer due to interfacial solvent transfer.

The temperature of the solution prior to adding the thermoplastic polymer must be sufficiently high to insure that the melted solution does not freeze (transform into a crystalline solvate) but should be not be so high that degradation of the polymers occurs in solution. For sulfuric acid solutions, temperatures between 75–110° C. are useful. In order to prevent gross phase separation, it is usually necessary to continue agitation of the solution or to form into oriented, shaped articles shortly after the solution is formed.

In accordance with the process of the invention, the anisotropic phase of the biphasic solution is oriented and then the solvent is removed to produce oriented, shaped articles. A number of techniques can be used such as forming fibers by spinning or extruding the dope into films. Orientation of the anisotropic phase can be by applying shear forces to or elongational flow to the liquid solution. The techniques for solvent removal must be capable of removing the solvent from the high viscosity solutions (the solution viscosity is typically greater than 100 poise). Techniques which are suitable for this task are air-gap wet spinning and film extrusion processes where the solution passes through a spinneret or die into an air gap and subsequently into a coagulant bath where the solvent is removed from the blend. In general, fiber spinning and film extrusion processes useful for forming the para-aramid polymer into high strength fibers and films are useful for spinning the blend fibers in accordance with the present invention. Fibers of the invention can be produced by the method disclosed in U.S. Pat. Nos. 3,767,756 and 3,869,429, the disclosures of which are hereby incorporated by reference.

Dopes can generally be extruded at any temperature where they are sufficiently fluid. Since the degree of polymer degradation is dependent upon time and temperature, temperatures below about 120° C. are usually used and temperatures below about 90° C. are preferable. If higher temperatures are required or desired for any reason, processing equipment should be designed so that the dope is exposed to the higher temperatures for a minimum time.

In accordance with the process described in U.S. Pat. Nos. 3,767,756 and 3,869,429 for making fibers, dopes are extruded through spinnerets and the extruded dope is conducted into a coagulation bath through a noncoagulating fluid layer. While in the noncoagulating fluid layer, the extruded dope is stretched from as little as 1 to as much as 15 times its initial length (spin stretch factor). The fluid layer is generally air but can be any other inert gas or even liquid which is a noncoagulant for the dope. The noncoagulating fluid layer is generally from 0.1 to 10 centimeters in thickness.

The coagulation bath is aqueous and ranges from pure water, or brine, to as much as 70% sulfuric acid. Bath temperatures can range from below freezing to about 28° C. or, perhaps, slightly higher. It is preferred that the temperature of the coagulation bath be kept below about 10° C., and more preferably, below 5° C., to obtain fibers with the highest tensile properties.

After the extruded dope has been conducted through the coagulation bath, the dope has coagulated into a fiber swollen with coagulant. The fiber should be thoroughly washed to remove salt and acid from the interior of the swollen fiber. Fiber-washing solutions can be pure water or they can be slightly alkaline. Washing solutions should be such that the liquid in the interior of the swollen fiber, after washing, should be essentially neutral.

The washed yarn can be dried by air drying or heating such as in an oven or by passing the wet yarn over multiple wraps on a pair of steam-heated rolls.

In oriented, shaped article made by the process of the invention, the lyotropic polymer makes up a first polymer phase of the articles and the thermally-consolidatable polymer is found within a second polymer phase. Characteristic of the first polymer phase is that it is at least substantially continuous in the direction of orientation the articles when viewed at a magnification of 9000×. For a fiber in which the direction of orientation is longitudinal, this structure is visible in FIG. 1 which is a transmission electron micrograph (TEM) at 9000× of a longitudinal section of the preferred fiber in accordance with the invention. The first polymer phase appears to be darker than the lighter colored second polymer phase. "Continuous in the direction of orientation" and "longitudinally continuous" in the case of fibers is intended to indicate that fibrils of the para-aramid polymer in the first polymer phase extend essentially continuously in the direction of orientation or along the length of the article when viewed at 9000×.

Preferably, the articles are highly oriented. For fibers of the invention, the orientation angle is preferably less than about 30°, most preferably less than about 20°.

The second polymer phase containing the thermally-consolidatable polymer interpenetrates the first polymer phase throughout the article. It is most preferable for the first and second polymer phases to be co-continuous in the article, i.e., both phases are continuous in the direction of orientation. The co-continuous structure is visible in transmission electron micrographs of the cross-section and longitudinal section at 9000× and above. For example, FIG. 1 is a TEM of the longitudinal section showing the first and second polymer phases propagating continuously along the fiber direction. FIG. 2 is a TEM of the fiber cross-section showing the two polymer phases interpenetrate each other.

The oriented shaped articles of the invention are formable into consolidated parts by the application of heat and pressure. Known techniques for "prepreg" are useful for forming consolidated parts from fibers in accordance with the invention, either by placing fibers in an appropriate mold and compressing the fibers while maintaining a temperature at or above the melting point, glass transition temperature or reaction temperature of the thermally-consolidatable polymer to form the consolidated parts. Unidirectional composites, composites containing fabrics woven from fibers of the invention, composites from discontinuous fibers can be made by such techniques. Fibers which have been pulped or fibrids can be directly made into paper by a wet-lay process. Such papers can be consolidated by heat and pressure into three dimensional composites. Unidirectional composites in accordance with the invention exhibit short beam shear values of greater than about 4 kpsi.

In the consolidated parts, the morphology of the first polymer phase in the oriented shaped articles used to make the composite is generally preserved in the composite structure while the second phase is consolidated and becomes a somewhat continuous matrix for the first polymer phase. In general, the mechanical properties of the elongated shaped articles translate into the properties of the composites. The mechanical properties in the composites are equal to the properties predicted for short fiber reinforced composites and thus the invention provides the ability to make composites with excellent properties directly from as-spun fibers and films.

The examples which follow illustrate the invention employing the following test methods. Parts and percentages are by weight unless indicated otherwise.

TEST METHODS

Transmission Electron Microscopy:

Transmission electron micrographs (TEM) of the cross-section and longitudinal section of the fiber were prepared using the following procedures.

Samples are prepared by first embedding a well-aligned bundle of fibers (approximately 10 filaments) in epoxy. Specimens to be cross-sectioned are most easily embedded using a BEEM size 00 capsule. A razor is used to make both a slit across the tapered tip of the capsule along a diameter and a "V" cut in the flat top of the capsule. The fiber bundle is inserted through the two cuts so that the bundle axis coincides with the capsule axis. The capsule is then filled with epoxy, the epoxy is cured overnight in a 70 degree C. oven, and the embedded fiber sample is removed from the capsule. In order to prepare specimens to be sectioned longitudinally, the two ends of a fiber bundle are taped to a TEFLON ® plate A drop of epoxy is placed between the ends of the bundle and allowed to cure overnight in a 70 degree C. oven. A short segment is cut from the epoxied area and attached to the end of a Bakelite stub with epoxy.

Sections 2000 to 2500 Angstroms thick are cut from the embedded fiber specimens using a Du pont MT6000 Ultramicrotome and a diamond knife at a cutting speed of 0.7 mm/sec. In the case of cross-sections, the cutting direction is essentially perpendicular to the long axis of the fiber, and in the case of longitudinal-sections, the cutting direction is essentially parallel to the long axis of the fiber. The fiber sections are then transferred to 3 mm diameter, 200 mesh electron microscope grids.

JEOL 200CX TEM/STEM equipped with a goniometer specimen stage and operated at an accelerating potential of 200 keV is used to examine the fiber sections at the desired magnification (an objective aperature may be used to improve contrast) and the image is recorded on electron image film. The film is placed in a photographic enlarger where the recorded image is enlarged 3× and projected onto photographic film from which a positive print is made.

Tensile Properties:

Yarn properties are measured at 21.1° C. and 65% relative humidity which have been conditioned under the test conditions for a minimum of 16 hours. Yarn denier is calculated by weighing a known length of yarn. The tenacity (grams/denier, gpd), elongation(%), initial modulus (gpd).as defined in ASTM D2101 are calculated from the load-elongation curves at 10% strain per minute on sample lengths of 25.4 cm and the measured yarn denier. Before each test, the yarns were twisted. The twist multiplier used to correlate twist per unit of length with linear density for PPD-T yarns (Examples 1-10) was 1.1, where twist multiplier is defined as $$T.M. = \frac{(twist/inch) \times (denier)^{1/2}}{73}$$

Fiber X-ray Orientation Angle:

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film (Catalogue Number 154-2463), in a Warhus pinhole camera. Collimators in the camera are 0.64 mm in diameter. The exposure is continued for about fifteen to thirty minutes (or generally long enough so that the diffraction feature to be measure is recorded at an Optical Density of ~1.0).

A digitized image of the diffraction pattern is recorded with a video camera. Transmitted intensities are calibrated using black and white references, and gray level is converted into optical density. A data array equivalent to an azimuthal trace through the two selected equatorial peaks is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak. Both peaks are measured and the Orientation Angle is taken as the average of the two measurements.

Inherent Viscosity:

Inherent Viscosity (IV) is defined by the equation:

$$IV = \ln(\theta rel)/c$$

where c is the concentration (0.5 gram of polymer in 100 ml of solvent) of the polymer solution and θrel (relative viscosity) is the ratio between the flow times of the polymer solution and the solvent as measured at 30° C. in a capillary viscometer. The inherent viscosity values reported for PPD-T are determined using concentrated sulfuric acid (96% $H_2SO_4$).

Composite Testing:

Tensile testing of composite bars was performed according to the ASTM method D 3039-76; "Tensile Properties of Fiber-Resin Composites". The composite sample size was ½"×6"×0.030-0.050". The composite tabs were used. It was preferable to use hydraulic grips to hold the sample during testing. A DSST (dual-sensor strain transducer) consisting of two sensors, arranged so as to measure axial strains on the opposite sides of the test specimen was sometimes used for strain measurement.

Flex testing of composite bars was done according to the ASTM method D 790-84a; "Flexural properties of Unreinforced and Reinforced Plastic and Electrical Insulating Materials".

Short beam shear strength was measured according to ASTM D 4255-83; "Inplane Shear Properties of Composite Laminate".

Flex fatigue testing was done using a three-point flex loading and a span to depth ratio of 16 to 1 (as described in ASTM D790-84a). A testing frequency of 5 Hz was used and the sample was loaded under a sinusoidal loading. Failure was defined when the bar was broke such that continued loading was not possible.

Domain Size - Spin Dopes:

Spin dopes were examined with optical microscopy to determine the biphasic nature of these solutions. For the poly(paraphenylene terephthalamide), polyamide, sulphuric acid dopes, samples were prepared by scraping a thin layer of solidified dope at room temperature. This was placed between two glass slides. The slides were set into a Mettler FP82 hot stage held at about 90° C. When the dope melted, the slides were pushed firmly togther using hand pressure. This resulted in a thin, translucent layer of solution. The sample was allowed to relax for about an 1-1.5 hours.

The samples were observed with polarized and cross-polarized light using a Nikon polarizing optical microscope equipped with a camera. It has been shown that static (relaxed) isotropic solutions when placed between crossed polarizing elements will transmit essentially no light. However, anisotropic dopes will transmit light and a relatively bright field is observed. Since these solutions are composed of two phases, one being isotropic and one being anisotropic, the two phases can be distinguished by comparison of observation between polarized and cross polarized light. The samples were viewed and photographed at 100×. Polariod type 57 3000 ASA film was used. Size of the isotropic domains was determined by measurement of isotropic domains on the photographs.

Examples 1-10

The following procedures were used to prepare fibers with the composition and spinning conditions given in Tables I and II and measured yarn properties listed in Table III below:

In a high shear Atlantic mixer, sulfuric acid (100.5%) was chilled to 0 to −10° C. for half to three quarters of an hour forming a slush. Dry poly(p-phenylene terephthalamide)(PPD-T) crumb was added to chilled sulfuric acid and mixed to disperse the crumb throughout the mixture. The mix was heated to about 70° C. and mixed for an hour under 30 in Hg vacuum. Then, the temperature was raised to about 80° C. and mixed for an additional hour and the matrix polymer was added to this solution, and mixed at about 80° C. for a half hour under 30 in Hg vacuum. The dope was allowed to degass for a half hour under vacuum at 80° C. The spin dope prepared appeared homogeneous to the unaided eye, exhibits stir opalescence and depolarizes polarized light.

The spin dope was immediately pumped to the spin cell while maintaining the process temperature at 80° C. The transfer lines and spinneret pack were maintained at approximately the same temperature as the mixing pot where the processing dope is prepared. The dope was pumped through a filter pack consisting of a Dynalloy filter and several fine mesh grids. The dope then passes through a spinneret having a hole diameter of 0.0025 inch. The dope was spun at 75° to 80° C. through a 0.25 inch air gap into a coagulation stream (as described in Yang, U.S. Pat. No. 4,430,559). Water at about 0° C. is used as the coagulating fluid. A spin stretch factor (SSF), i.e., velocity of wind up/velocity of exit, of about 6.0 or slightly higher was used to prepare the high modulus composite fibers. To remove and neutralize acid, the fiber was passed over wash roll and washed with water and dilute NaOH solution. The fiber was collected wet or passed over drying rolls as indicated in Table II and collected.

The transmission electron micrographs of the longitudinal section and cross-section and of the fiber produced from Example 1 are shown in FIGS. 1 and 2, respectively. The cross-section of the filament is observed to have an interconnected "co-continuous" structure of both the PPD-T and the amorphous polyamide. The longitudinal section of the filament shows a continuous phase of poly(p-phenylene teraphalamide) along the fiber length.

TABLE I

| Example | Aramid | Resin | Resin (wt %) | Solids (wt %) |
|---|---|---|---|---|
| 1 | PPD-T | Polyamide 1 | 30 | 18.5 |
| 2 | PPD-T | Polyamide 2 | 30 | 19.0 |
| 3 | PPD-T | Polyamide 2 | 40 | 17.0 |
| 4 | PPD-T | Polyamide 2 | 20 | 19.4 |
| 5 | PPD-T | Polyamide 2 | 35 | 19.0 |
| 6 | PPD-T/2,6 N (90/10) | Polyamide 2 | 30 | 19.0 |
| 7 | PPD-T | PEKK | 30 | 19.0 |
| 8 | PPD-T | Polyamide 3 | 30 | 19.0 |
| 9 | PPD-T | Polyamide 4 | 30 | 19.0 |
| 10 | PPD-T | Polyamide 2 | 30 | 19.0 |

| Code | CHEMICAL STRUCTURE | Tg | Tm |
|---|---|---|---|
| Polyamide 1 | HMD-6 | 50 C | 265 C |
| Polyamide 2 | PACM/HMD//T/I 4/96//30/70 | 130 C | — |
| Polyamide 3 | PACM-12 | 145 C | 285 C |
| Polyamide 4 | PACM/HMD//T/I 45/55//60/40 | 160 C | — |
| PEKK | Poly(ether ketone ketone) | | | where:
PACM = bis(p-aminocyclohexyl) methane
HMD = hexamethylene diamine
T = terephalic acid
I = isophalic acid
6 = adipic acid
12 = dodecanedioic acid

TABLE II

| Example | Mix/proc. Temp. | Solvent | Dry Roll Temp | SSF |
|---|---|---|---|---|
| 1 | 70–80° C. | H2SO4 | NONE | 6.5 |
| 2 | 70–80° C. | H2SO4 | 181° C. | 6.0 |
| 3 | 70–80° C. | H2SO4 | 158° C. | 6.0 |
| 4 | 70–80° C. | H2SO4 | 158° C. | 6.0 |
| 5 | 70–80° C. | H2SO4 | 180° C. | 6.0 |
| 6 | 70–80° C. | H2SO4 | NONE | 6.8 |
| 7 | 70–80° C.(90° C.) | H2SO4 | NONE | 3.4 |
| 8 | 70–80° C. | H2SO4 | 180° C. | 6.0 |
| 9 | 70–80° C. | H2SO4 | 180° C. | 6.0 |
| 10 | 70–80° C. | H2SO4/MSA (70w/30w) | 179° C. | 6.0 |

TABLE III (Yarn Properties)

| Example | Tenacity (gpd) | Elongation (%) | Modulus (gpd) | OA |
|---|---|---|---|---|
| 1 | 16.9 | 2.5 | 636 | 10.5 |
| 2 | 16.6 | 2.4 | 583 | |
| 3 | 7.2 | 1.9 | 430 | 16.2 |
| 4 | 15.8 | 2.6 | 685 | 15.6 |
| 5 | 13.5 | 2.1 | 637 | |
| 6 | 13.4 | 3.3 | 428 | |
| 7 | 12.0 | 3.5 | 273 | 18.9 |
| 8 | 6.9 | 2.2 | 323 | 18.4 |
| 9 | 16.4 | 2.6 | 620 | 13.8 |
| 10 | 10.2 | 2.3 | 473 | |

EXAMPLE 11

This example illustrates the preparation of a blend fiber containing 60 wt. % poly(p-phenylene terephthalamide) (PPD-T) and 40 wt. % amorphous aliphatic-aromatic polyamide.

A spin solution was prepared according to the procedure described in Examples 1–10 except that the blend solution contained 18.5 wt. % polymers. Initially, 52.9 lb. 100% sulfuric acid was stirred in a batch mixer and cooled to −9° C. in about 40 minutes. The stirrer was then stopped. A polymer mixture of 7.2 lbs. of PPD-T polymer (6.3 dl/g inherent viscosity) and 4.8 lb. of an amorphous nylon (a copolymer of hexamethylene diamine, bis(p-aminocyclohexyl)methane, isophthalic acid, and terephthalic acid in a 96/4/70/30 mole ratio - polyamide 2) was added to the batch mixer, and stirring was resumed. The solution mixture temperature was then increased to 70° C., and mixing continued for another hour. The solution was deaerated under vacuum about one hour. The resulting solution was anisotropic. When examined by an optical microscope under cross polarized light, the solution exhibited intense depolarization and a uniform domain structure with no evidence of gross separation of either polymer phase. The average domain size of the microscopic specimen was estimated to be on the order of 100 microns. The solution gave an endothermic peak of 73.7° C., and an exothermic peak of 32.3° C. as measured by differential scanning calorimetry. These phenomena are characteristic of an anisotropic solution.

The solution was maintained at 75°–80° C. and extruded at 160 g/min through a spinneret with 1000 holes of 0.0025 in. (0.063 mm) diameter. The extruded filaments passed through a 0.25 in. (6.3 mm) long air gap into a coagulation bath of water into a spin tube as described in U.S. Pat. No. 4,340,559 (Yang). The coagulated filaments were washed with water and neutralized with 0.4% sodium hydroxide solution on rotating rolls. The neutralized filaments were then dried on steam-heated rolls at about 140° C. and about 2500 g total threadline tension. A dry 1500 denier yarn was thus wound up by a winder at 200 yd/min (183 m/min). The resulting yarn gave 12.7 gpd tenacity, 2.9% elongation at break, and 444 gpd modulus.

EXAMPLE 12

Composite yarn of Example 2 was wound around an 8"×7"×⅛" aluminum plate with rounded edges. The yarn used was 400 denier 70/30 w/w PPD-T/polyamide 2 (Tg=130° C.) spun from 19.0% solids solution. (10" yarn T/E/M=16.6 gpd/2.4%/583 gpd; 287 ksi/2.4%/10.1 Msi). The wound plate was compression molded under a strong nitrogen purge at 200° C./50 psi for five minutes. The partially consolidated sheet was then cut and stacked unidirectionally into 6"×3" or 6"×⅛" mold. The molding conditions were 300° C./1000 psi for 15 minutes. The 6"×3" plaque was cut into 6"×⅛" strips. The composite sample prepared had a tensile strength of 198 ksi and a tensile modulus of 10.2 Msi. The flex modulus was 9.2 Msi and the flex strength was 102 ksi. The short beam shear strength was measured to be 7.9 and 9.7 ksi. The tensile and flex performance of the composite bar prepared with the yarn of this invention is comparable to conventional Kevlar ®/polyamide composites. The flex fatigue performance of this composite sample was evaluated and under cyclic loading from 8% to 80% of its failure load. The sample was found to fail after 115,000 cycles. This is outstanding in comparison to conventional Kevlar ®/polyamide composite, which under similar loading fail at about one third the value.

When molding the card wound yarn, it is preferable to use the minimum pressure and temperature which will produce a handleable sheet. That temperature and pressure will be dependent upon the matrix resin. This results in improved adhesion, and lower consolidation pressures in the final part.

I claim:

1. A process for making thermally-consolidatable oriented, shaped articles containing a substantially continuous phase of para-aramid polymer in the direction of orientation comprising the steps of:

forming under agitation a liquid solution of said para-aramid polymer having an inherent viscosity of at least about 3 dl/g and a thermoplastic polymer in a common solvent, said solution having a total article-forming polymer concentration sufficient that the solution is bi-phasic and comprises an anisotropic phase and an isotropic phase, at least, about 55% and less than about 80% by weight said article-forming polymers being said para-aramid polymer and at least about 20% and less than about 45% by weight of said article forming polymers being said thermoplastic polymer, said anisotropic and isotropic phases being interdispersed and said anisotropic phase being present in domains with the size of the domains being on the average less than about 300 microns;

orienting the anisotropic phase of said bi-phasic liquid solution; and removing said solvent to produce oriented shaped articles.

2. The process of claim 1 wherein said concentration of said article-forming polymers in said liquid solution is between about 10 and 25% by weight.

3. The process of claim 1 wherein said common solvent is sulfuric acid having a concentration in the range of about 99–102% by weight $H_2SO_4$.

4. The process of claim 1 wherein said orienting of said anisotropic phase and removing of said solvent is performed by extruding said liquid solution from an orifice through a layer of inert non-coagulating fluid into a coagulating bath.

5. The process of claim 1 wherein at least about 60% of said article-forming polymers is said para-aramid.

6. The process of claim 1 wherein said para-aramid is poly(paraphenylene terephthalamide) having an inherent viscosity of at least about 4 dl/g.

7. The process of claim 1 wherein said thermally-consolidatable polymer is selected from the class consisting of thermoplastic polymers.

8. The process of claim 1 wherein said thermally-consolidatable polymer is selected from the class consisting of thermoplastic polyamides.

9. The process of claim 1 wherein said thermally-consolidatable polymer is selected from the class consisting of polyarylates.

10. The process of claim 1 wherein said process produces an oriented, shaped article in the form of a fiber.

11. The process of claim 1 wherein said process produces an oriented, shaped article in the form of a film.

12. The process of claim 1 wherein said bi-phasic solution is formed such that said domain size of said anisotropic phase is less than about 100 microns.

13. The process of claim 1 wherein said biphasic solution is formed by dissolving said para-aramid in said solvent and then subsequently adding said thermally-consolidatable polymer.

* * * * *

UNITED STATES PATENT AND TRADEMARK OFFICE
CERTIFICATE OF CORRECTION

PATENT NO. : 5,011,643

DATED : April 30, 1991

INVENTOR(S) : Hung H. Yang

It is certified that error appears in the above-identified patent and that said Letters Patent is hereby corrected as shown below:

Col. 12, line 6, claim 1, change "anisotropic" to --isotropic--.

Col. 12, line 45, claim 12, change "anisotropic" to --isotropic--.

Signed and Sealed this

Twenty-second Day of December, 1992

Attest:

DOUGLAS B. COMER

*Attesting Officer*      Acting Commissioner of Patents and Trademarks